United States Patent
Ishii et al.

(10) Patent No.: US 7,570,748 B2
(45) Date of Patent: Aug. 4, 2009

(54) CONTROL AND MONITORING TELECOMMUNICATION SYSTEM AND METHOD OF SETTING A MODULATION METHOD

(75) Inventors: Yoshikazu Ishii, Hitachinaka (JP); Setsuo Arita, Hitachiota (JP); Yuji Ichinose, Mito (JP); Nao Saito, Hitachi (JP); Daisuke Sinma, Hitachi (JP); Yasuhiro Nakatsuka, Naka (JP)

(73) Assignee: Hitachi, Ltd., Tokyo (JP)

( * ) Notice: Subject to any disclaimer, the term of this patent is extended or adjusted under 35 U.S.C. 154(b) by 752 days.

(21) Appl. No.: 11/018,355

(22) Filed: Dec. 22, 2004

(65) Prior Publication Data

US 2005/0141683 A1    Jun. 30, 2005

(30) Foreign Application Priority Data

Dec. 25, 2003  (JP)  ............................. 2003-428871

(51) Int. Cl.
*H04M 11/06* (2006.01)
(52) U.S. Cl. ............................. 379/93.01; 379/399.01; 370/206; 375/147; 375/260; 381/98; 455/500; 704/200.1
(58) Field of Classification Search ............ 379/399.01, 379/93.01; 342/389; 348/22; 370/206; 398/201; 714/755; 102/215; 375/222, 147, 375/260; 455/464, 500; 381/98; 704/200.1
See application file for complete search history.

(56) References Cited

U.S. PATENT DOCUMENTS

| | | | | |
|---|---|---|---|---|
| 4,804,964 A | * | 2/1989 | Takai et al. ................. | 342/389 |
| 4,945,404 A | * | 7/1990 | Miller ......................... | 348/22 |
| 4,947,480 A | * | 8/1990 | Lewis ......................... | 702/196 |
| 5,357,251 A | * | 10/1994 | Morley et al. ............... | 341/172 |
| 5,371,853 A | * | 12/1994 | Kao et al. ................... | 704/200.1 |
| 5,533,010 A | * | 7/1996 | Tanaka ....................... | 455/464 |
| 5,675,572 A | * | 10/1997 | Hidejima et al. ............ | 370/206 |
| 6,052,336 A | * | 4/2000 | Lowrey, III ................. | 367/139 |

(Continued)

FOREIGN PATENT DOCUMENTS

EP    1 065 818 A1    1/2001

(Continued)

OTHER PUBLICATIONS

Draft American National Standard for Telecommunications—Network and Customer Installation Interfaces—Asymmetric Digital Subscriber Line (ADSL) Metallic Interface, ANSI, T1.413-1998, Revision of ANSI T1.413-1995, pp. 95-135.

*Primary Examiner*—Gerald Gauthier
(74) *Attorney, Agent, or Firm*—Dickstein Shapiro LLP

(57) ABSTRACT

Using a network in which one master station modem 105 and multiple slave station modem 106, 107, 108 are physically connected by rudder connection or bus connection with a telecommunication line 121, the measurement result of the S/N ratio between the master station and slave stations is once collected in the master station at the initialization stage, pairs of the modulation method, by which all modems can demodulate at high probability, and transmission voltage are calculated based on this data, and the calculation is transmitted to all slave stations; and at a normal transmission stage, information regarding the coordination and control of the network is transmitted in accordance with this setting. Thus, one-to-multi communication is realized, guaranteeing an access right.

11 Claims, 9 Drawing Sheets

U.S. PATENT DOCUMENTS

| | | | | |
|---|---|---|---|---|
| 6,115,426 | A * | 9/2000 | Fujimoto et al. | 375/260 |
| 6,127,973 | A * | 10/2000 | Choi et al. | 342/378 |
| 6,141,317 | A | 10/2000 | Marchok et al. | |
| 6,181,453 | B1 * | 1/2001 | Darcie et al. | 398/201 |
| 6,470,470 | B2 * | 10/2002 | Jarvinen et al. | 714/755 |
| 6,473,394 | B1 | 10/2002 | Marchok et al. | |
| 6,553,062 | B1 * | 4/2003 | Marum | 375/222 |
| 6,556,836 | B2 * | 4/2003 | Lovberg et al. | 455/505 |
| 6,584,205 | B1 * | 6/2003 | Croft et al. | 381/98 |
| 6,611,696 | B2 * | 8/2003 | Chedester et al. | 455/562.1 |
| 6,637,033 | B1 * | 10/2003 | Cloonan et al. | 725/117 |
| 6,639,537 | B1 * | 10/2003 | Raz | 341/155 |
| 6,665,546 | B2 * | 12/2003 | Slaughter et al. | 455/562.1 |
| 6,768,927 | B2 * | 7/2004 | Krogmann | 700/28 |
| 6,966,262 | B2 * | 11/2005 | Jennings, III | 102/215 |
| 6,987,856 | B1 * | 1/2006 | Feng et al. | 381/92 |
| 2002/0093989 | A1 | 7/2002 | Cioffi et al. | |
| 2003/0002866 | A1 * | 1/2003 | Owa et al. | 386/126 |
| 2003/0193889 | A1 | 10/2003 | Jacobsen | |
| 2005/0085255 | A1 * | 4/2005 | Andersson et al. | 455/522 |
| 2008/0305877 | A1 * | 12/2008 | Hazama | 463/43 |

FOREIGN PATENT DOCUMENTS

| | | |
|---|---|---|
| JP | 2001-25000 | 1/2001 |
| WO | WO 02/100008 A1 | 12/2002 |

\* cited by examiner

FIG. 12

TRAINING SYMBOL NUMBER

| | | OVERHEAD REFERENCE | | |
|---|---|---|---|---|
| | | 10% | 5% | 1% |
| NUMBER OF TERMINALS | 5 | 700 | 350 | 70 |
| | 10 | 350 | 175 | 35 |
| | 20 | 175 | 87.5 | 17.5 |
| | 30 | 116.6667 | 58.33333 | 11.66667 |
| | 40 | 87.5 | 43.75 | 8.75 |
| | 50 | 70 | 35 | 7 |
| | 60 | 58.33333 | 29.16667 | 5.833333 |
| | 70 | 50 | 25 | 5 |
| | 80 | 43.75 | 21.875 | 4.375 |
| | 90 | 38.88889 | 19.44444 | 3.888889 |
| | 100 | 35 | 17.5 | 3.5 |

CONTROL AND MONITORING TELECOMMUNICATION SYSTEM AND METHOD OF SETTING A MODULATION METHOD

CLAIM OF PRIORITY

The present application claims priority from Japanese patent application serial No. 2003-428871, filed on Dec. 25, 2003, the content of which is hereby incorporated by reference into this application.

BACKGROUND OF THE INVENTION

The present invention relates to a control and monitoring telecommunication system for connecting and communicating between a site such as power plant and shopping mall where apparatuses to be controlled and monitored are located and a control room and monitor room where operators and observers are stationed, and also to a method of setting a modulation method for the communication.

A need for remote monitoring or remote maintenance of existing plant has been increasing in many plants including power plant. In a shopping mall or large-scale shop, a need for installing or adding monitor cameras is also increasing in view of higher security.

It therefore has become necessary to lay a dedicated cable newly between the site and monitor room or control room so as to transmit the data obtained by the sensors and actuators that have not been connected in a network or monitor cameras, sensors and actuators that have been newly installed from these apparatuses to the monitor room or control room. On the other hand, since there are large apparatuses or inverters installed at the site, eliminating the effect of the electromagnetic noise to be caused by driving these apparatuses needs to be considered. The construction cost needed to lay a dedicated cable in an existing installation so as to avoid the effect or eliminate the noise in the telecommunication turns to be higher than the construction cost of a telecommunication line for measuring and control points spent at the time of initial plant construction.

Generally, in a power plant, various sites including turbine room and boiler room are located far from each other by hundreds to thousand meters within an area, and even in a shopping mall, monitor cameras need to be installed as distributed within a relatively wide outdoor space. If a one-to-one communication modem is employed for these applications, a star type network, where individual telecommunication line is laid between each site (monitor camera in the shopping mole application) and the monitor room, is needed but the installation cost and maintenance cost of the total network increases.

In order to resolve this problem, there has been proposed a method for utilizing an unused line or frequency band out of the existing telecommunication lines installed between the site and monitor room so as to reduce cost needed to lay a new dedicated line or take an anti-noise measures (see Japanese Laid-open Patent Publication No. 2001-25000).

Although Japanese Laid-open Patent Publication No. 2001-25000 (paragraphs 0026-0035, FIG. 1 and FIG. 2) also discloses a telecommunication mode where multiple modems are connected with a single telecommunication line, it lists nothing else but generally known coordination methods (methods where one modem serving as master allocates the transmission right; comprising four methods: token passing, collision sensing, time division multiplex, and frequency division multiplex). The patent does not contain any concrete description about detailed physical layer of communication but simply refers to a reference literature on xDSL (x digital subscriber line). Detailed description about the physical layer of the x DSL is given in "Draft American National Standard for Telecommunications-Network and Customer Installation Interfaces-Asymmetric Digital Subscriber Line (ADSL) Metallic Interface" (U.S.A.), American National Standards Institute, Inc. ANSI (R) T1. 413-1998, pp. 95-135, for example. The document, which is written on the physical layer of ADSL (asymmetric digital subscriber line), a typical xDSL, describes that, for the modems communicating with each other, training to cope with noise or attenuation and adjusting the communication setting based on the training (determining a modulation method for every carrier) are needed, explaining how to realize it. In this explanation, carrier means the frequency of carrier wave signal.

SUMMARY OF THE INVENTION

For the method proposed by Japanese Laid-open Patent Publication No. 2001-25000, however, one unused line is needed from a site to the monitor room. In a plant like the one explained above, however, it is not normal in many cases that an unused line for the connection with the monitor room has been provided at each site. In addition, these days, a token-ring type LAN has been provided between the site and monitor room and no unused line is available between them in many cases. Accordingly, there arises a problem that the method disclosed by the Patent Document 1 is hardly applicable to a relatively large-scale plant such as power plant or a plant where a token-ring type LAN has been provided.

Furthermore, in the date telecommunication by an existing installation where transmission of high-frequency signal has not been considered originally, it happens that the received signal waveform deforms or received signal power decreases tremendously due to attenuation, reflection and group delay as compared to the transmitted signal. Consequently, it happens that token cannot be sent or received in a suitable manner or collision of signals cannot be sensed. In addition, because timing signal can also be neither sent nor received, appropriate time division processing for a pair of the transmitted and received data becomes difficult. It is hence impossible to carry out independently the coordination necessary for multi-to-multi or at least one-to-multi telecommunication and the coordination of communication setting for one-to-one telecommunication as above. This means that multi-to-multi telecommunication cannot be made available simply by adding a coordination method such as toke passing to the technology such as xDSL. In addition, for control applications, it is important that an access right as originally designed is guaranteed for all modems and that data can be transmitted and received by broadcasting.

In consideration of the above problems, an object of the present invention is to offer a means for performing one-to-multi telecommunication for broadcasting and coordination, guaranteeing an access right, using an existing telecommunication line, particularly a telecommunication line provided with no anti-noise measures in case the information obtained by apparatuses that have not been connected to a network or newly installed is transmitted to a monitor room or control room.

The present invention solving the above problems is a control and monitoring telecommunication system for the communication between the apparatuses installed at a site in a specified area and a control room as well as a method of setting a modulation method. Prior to the data transmission from a master station to a slave station or from a slave station to a master station, the information as to the destination to/from whom the data is to be transmitted and received is transmitted by a "modulation method by which all modems can demodulate at high probability" so that other slave stations can recognize the destination. In this description, a "specified area" means the premises of a plant or factory or a shopping mall. The "information as to the destination to/from whom the data is to be transmitted and received" is normally stored in the header.

The master modem of this invention has a function of calculating the "modulation method by which all modems can demodulate at high probability" based on the result of the transmission path S/N ratio measured in the initialization sequence of the slave modem, and also transfers the calculation result to all slave modems after completion of the initialization sequence of all the slave modems. It is permissible to measure the data transmission error ratio instead of the S/N ratio.

By transmitting the header by the "modulation method by which all modems can demodulate at high probability" separately from user data, all stations can recognize the destination of the incoming communication at high probability without providing physical anti-noise measures such as shielding or physical adjustment of the transmission path characteristic such as terminal resistance. Accordingly, even if multiple stations are connected with each other on a single physical transmission path, appropriate coordination can be achieved.

BRIEF DESCRIPTION OF DRAWINGS

FIG. 12 is a diagram showing the relationship among the training symbol number, number of terminals and overhead according to an embodiment of the present invention.

DESCRIPTION OF THE PREFERRED EMBODIMENT

Preferred embodiments of the present invention are described hereunder in detail, using figures.

<<Configuration of Control and Monitoring Telecommunication System>>

Figure 1:
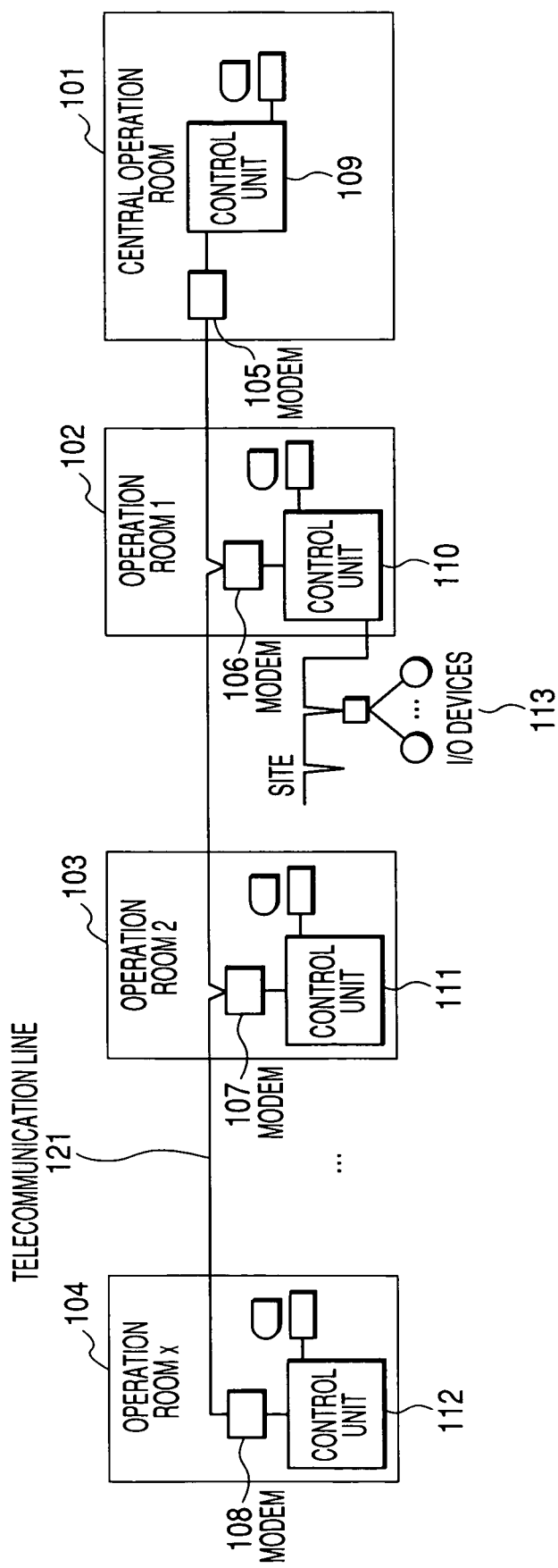
FIG. 1 shows the configuration of the control and monitoring telecommunication system according to an embodiment of the present invention.

FIG. 1 shows the configuration of the control and monitoring telecommunication system according to an embodiment of the present invention applied to a plant control and monitoring system. The figure does not show concrete apparatuses to be controlled in a plant but only shows the control and monitoring system and its configuration. The plant control and monitoring system comprises a central operation room 101, control units 109, 110, 111, 112 in the operation rooms 102, 103, 104 located at the site, and telecommunication line 121 connecting all these in a serial mode. The control unit 109 in the central operation room 101 is connected with the telecommunication line 121 via a master station modem 105 and the control units 110, 111, 112 are connected with it via slave station modems 106, 107, 108. I/O devices 113 at the site are connected with the control unit 110. Although no site I/O device is shown for the control units 111, 112 in FIG. 1, it is assumed that similar site I/O devices are connected with these control units. The central operation room 101 means a "control room" mentioned in the claims.

<<Construction of Modem>>

Figure 11:
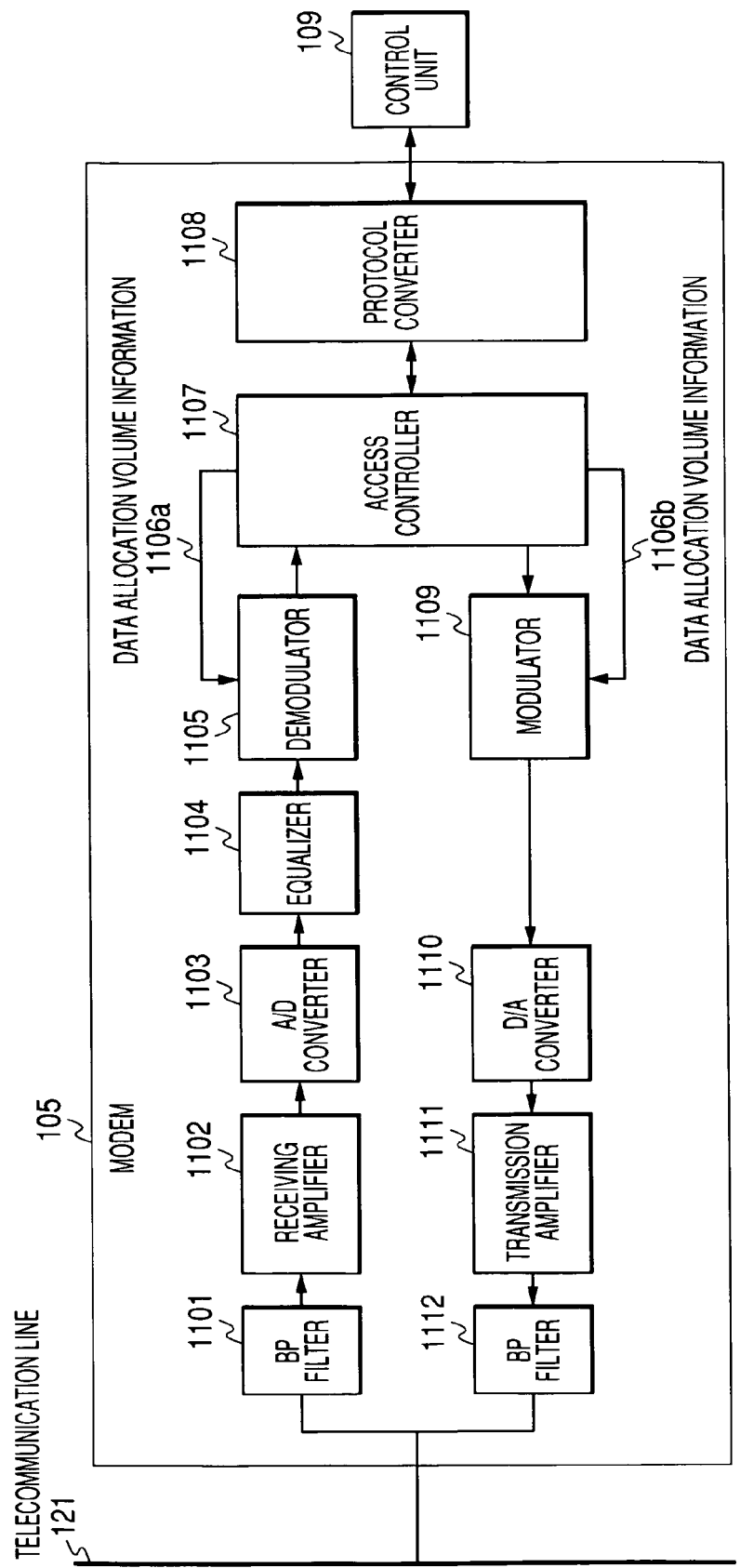
FIG. 11 a view showing the construction of a modem according to an embodiment of the present invention.

Next, the construction of the modem is described, using FIG. 11. FIG. 11 shows a basic construction of the modem 105 in FIG. 1. Other modems 106, 107 and 108 are constructed similarly. The modem 105 comprises BP filters (band pass filters) 1101, 1112, receiving amplifier 1102, transmission amplifier 1111, A/D converter (analog-to-digital converter) 1103, D/A converter (digital-to-analog converter) 1110, equalizer 1104, demodulator 1105, modulator 1109, access controller 1107, and protocol converter 1108.

<<Basic Operation of Modem>>

The basic operation in the communication between the modem 105 and other modems is described hereunder, and the operation is common in other modems. The modem 105 is equipped with a protocol converter 1108 for interfacing with the control unit 109. The control unit 109 can be constructed as a unit, for example, based on a PC (personal computer). This construction enables to utilize various kinds of package software, thereby allowing smooth information management and data processing. The protocol converter 1108 is provided with external connection interface such as Ethernet (R) or USB (universal serial bus) to enable the utilization. When the protocol converter 1108 receives data to transmit to other control unit from the control unit 109, it converts the data into a communication packet in a specified format to be handled by the modem 105 and transmits the converted communication packet to the access controller 1107. When the access controller 1107 receives the communication packet from the protocol converter 1108, it outputs the data contained in the received communication packet to the converter 1109. The converter 1109 allocates the data inputted from the access controller 1107 to each carrier wave signal based on the data allocation volume information 1106b, inputted separately from the access controller 1107, for the carrier wave signal of each frequency band. This is called bit allocation. The carrier wave signal to which the data has been allocated is then converted into an analog signal by the D/A converter 1110, amplified by the transmission amplifier 1111, outputted into the telecommunication line 121 such as a broadcasting line via the BP filter 1112, and then transmitted to other modems.

On the other hand, a signal transmitted from other modem (for example, from modem 107 in the description herein) to the modem 105 is limited to a signal of a specified communication band by the BP filter 1101 and outputted to the receiving amplifier 1102. The receiving amplifier 1102 amplifies the signal inputted from the BP filter 1101 and outputs it to the A/D converter 1103. The A/D converter 1103 converts the signal inputted from the receiving amplifier 1102 into a digital signal and outputs it to the equalizer 1104. The equalizer 1104, which functions to correct communication path distortion (also called transmission path distortion) of the telecommunication line 121, corrects the communication path distortion for the signal inputted from the A/D converter 1103 and outputs the corrected signal to the demodulator 1105. The demodulator 1105 takes out the data allocated to each carrier wave signal based on the data allocation volume information 1106a, inputted separately from the access controller 1107, for the carrier wave signal of each frequency band, and outputs it to the access controller 1107. The access controller 1107 converts the data inputted from the demodulator 1105 into a communication packet of a specified format and outputs the converted communication packet to the protocol converter 1108. The protocol converter 1108 converts the protocol of the communication packet inputted from the access controller 1107 in accordance with the interface with the control unit 109 (for example, Ethernet (R) or USB), and outputs the protocol-converted information to the control unit 109.

The access controller 1107 outputs the data allocation volume information 1106a and 1106b (carrier allocation information, which will be explained later) to the modulator 1105 and demodulator 1109, respectively. The data allocation volume defined by this information is not always constant. That is, training (learning) about the communication characteristic between the modem 105 and modem 107 is carried out at a specified interval so as to estimate the S/N ratio for every carrier wave signal of each frequency band or evaluate the data transmission error ratio (bit error ratio) in the communication, and the data allocation volume for every carrier wave signal of each frequency band or that for all carrier wave signals is varied. It is permissible to utilize both the estimation result of the S/N ratio and evaluation result of the data transmission error ratio to vary the data allocation volume.

<<Outline of Communication Between Modems>>

Figure 2:
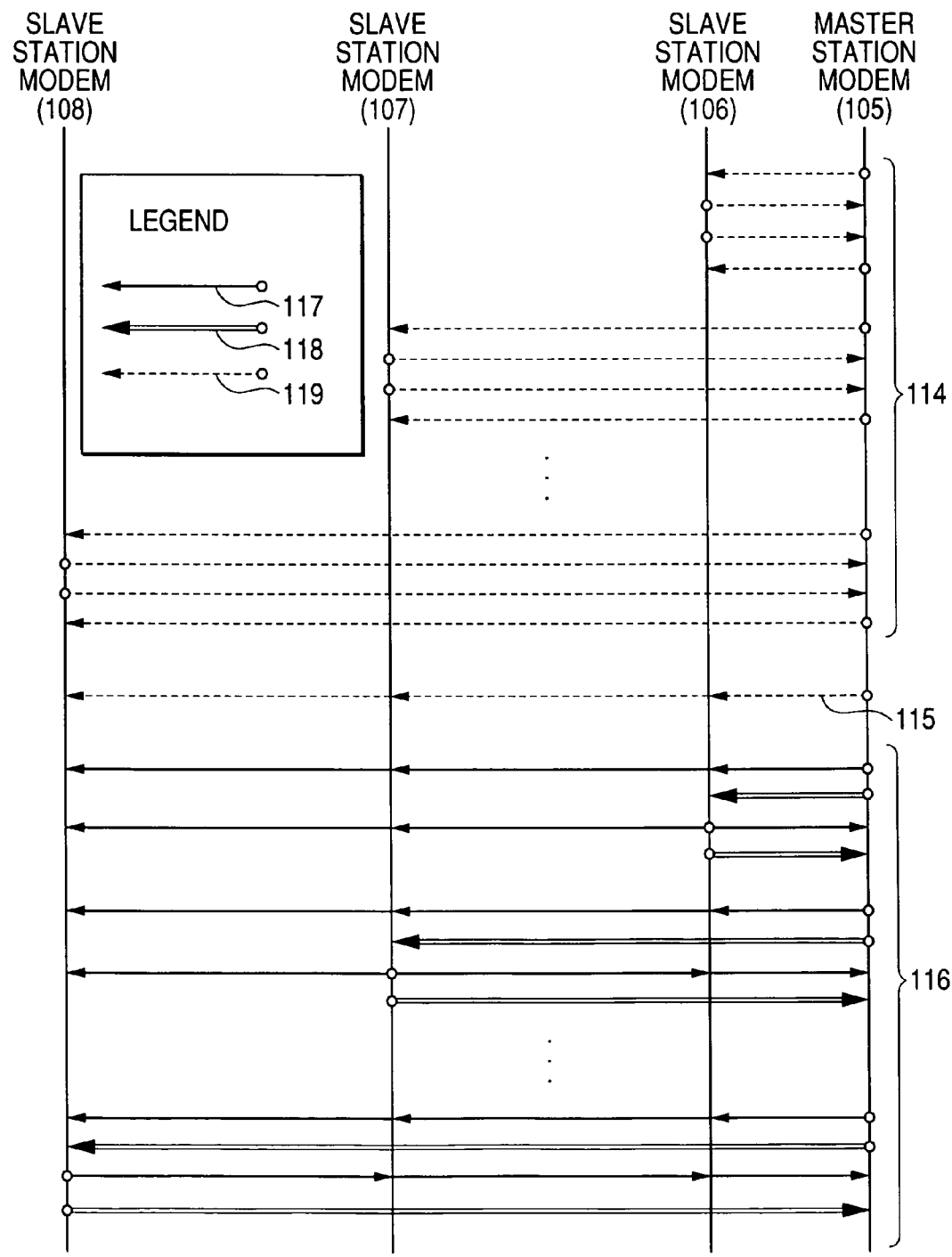
FIG. 2 is a diagram showing the communication procedure of the control and monitoring telecommunication system according to an embodiment of the present invention.

FIG. 2 shows the communication sequence between the modems. Sequence 114 is called an initialization sequence. Detailed description of the procedure will be given later. Broken-line arrow (legend 119) represents the transmission and receiving of header, training data and training result (information regarding the most suitable modulation method for each carrier obtained by a method described later, that is to say, the carrier allocation information) that has not only been modulated by a "modulation method by which all the modems connected with the telecommunication line 121 (see FIG. 1) (hereinafter, simply called all modems) can demodulate but in which no transmission path characteristic is considered" but also been coded by a coding system with high error correction capability.

In this description, carrier means the frequency of the carrier wave signal. The broken-line arrow 115 is based on the same modulation method as for the other broken lines but it represents the transmission of the information on the "modulation method by which all modems can demodulate at high probability". Sequence 116 represents data transmission from the master station modem to slave station modems, poling to slave station modems, and data transmission from slave station modems.

Bold-line arrow (legend 117) represents the transmission and receiving of header by the "modulation method by which all modems can demodulate at high probability". Double-line arrow (legend 118) represents the transmission and receiving of user data that has been modulated by the "most suitable modulation method" in accordance with the transmission path characteristic and noise characteristic between the master station modem and slave station modems. All arrows 117, 118 and 119 means data is transmitted from their tail (small circle in FIG. 2) to their head. In the data transmission by the broken-line arrow 115, although data is transmitted to all slave station modems connected with the telecommunication line 121 (see FIG. 1) (hereinafter, simply called all slave station modems) at one time, it is permissible to transmit data individually to each slave station modem. If it applies, header is modulated by the "modulation method by which all the modems can demodulate but in which no transmission path characteristic is considered" and coded by a coding system with high error correction capability, which is different from the modulation method employed in sequence 116 for the data transmission from the master station modem to slave station modems, poling to slave station modems, and data transmission from slave station modems.

Transferring information from a master station modem to multiple slave station modems at a time as above is called multi-destination communication or broadcasting. Although the multi-destination communication is employed in order to control the network in the above case, multi-destination communication may also be needed at a higher-level application that uses a telecommunication system as above. Particularly for control application, multiple apparatuses need to be controlled simultaneously. The control information transmitted and received in the above application is a kind of user data for the control and monitoring telecommunication system of the present invention.

Accordingly, multi-destination communication becomes necessary even for user data and therefore multi-destination communication shown by the arrow 115 may be performed even in sequence 116. When this is needed, by modulating and demodulating data by the "modulation method by which all modems can demodulate at high probability", to be described later, it becomes possible to transmit the data to all slave station modems at a data transmission error ratio lower than specified. Ensured data transmission (meaning transmission at a probability higher than specified) as above is indispensable particularly for control and monitoring application.

<<First Method of Setting a Modulation Method>>

Next, methods of setting the "modulation method by which all modems can demodulate at high probability" are described hereunder, using FIG. 3 to FIG. 8. These methods are to set a modulation method common to all modems so that header and user data are surely transmitted in the user data transmission between the master station modem and slave station modems. These methods represent a concrete procedure of setting the "modulation method by which all modems can demodulate at high probability" (step S914 in FIG. 9) in the operation of the master station modem and slave station modem m, to be described later.

Figure 3:
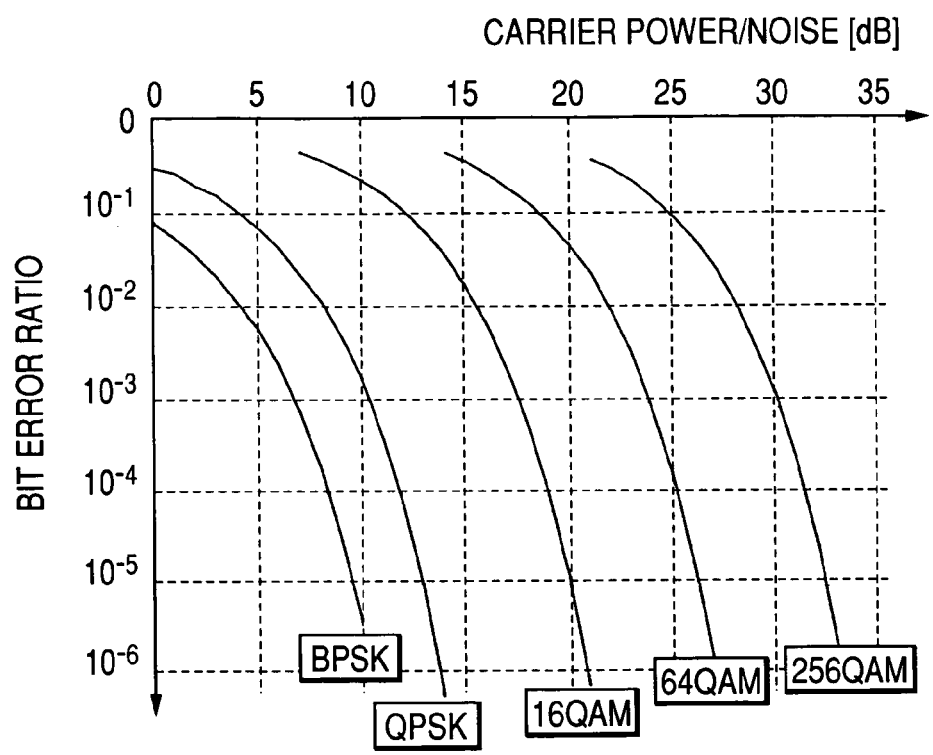
FIG. 3 is a diagram showing the C/N ratio (carrier power/noise) of each modulation method according to an embodiment of the present invention.

The first method is described hereunder. FIG. 3 shows the relationship between the ratio of carrier power to noise (carrier power/noise, C/N ratio) and bit error ratio in each modulation method. Modulation method includes BPSK (binary phase shift keying), QPSK (quadrature phase shift keying), 16QAM (quadrature amplitude modulation), 64QAM and 256QAM. BPSK and QPSK are phase modulation method, where data volume that can be transmitted by one carrier is 1 bit and 2 bits, respectively. 16QAM, 64QAM and 256QAM are phase-amplitude modulation method, where data volume that can be transmitted by one carrier is 4 bits, 6 bits and 8 bits, respectively.

Figure 4:
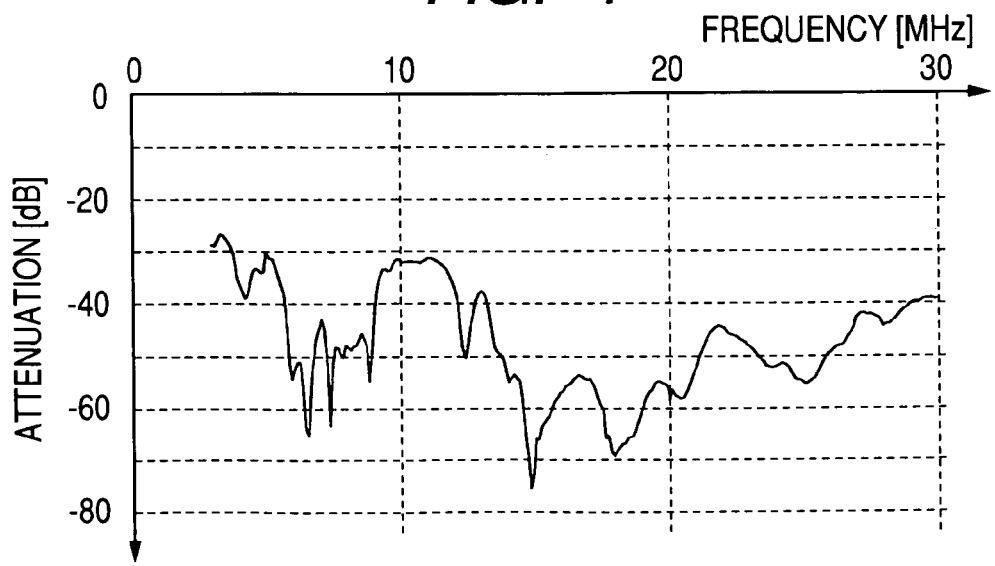
FIG. 4 is a diagram showing an example of attenuation characteristic of a broadcasting line according to an embodiment of the present invention.
Figure 5:
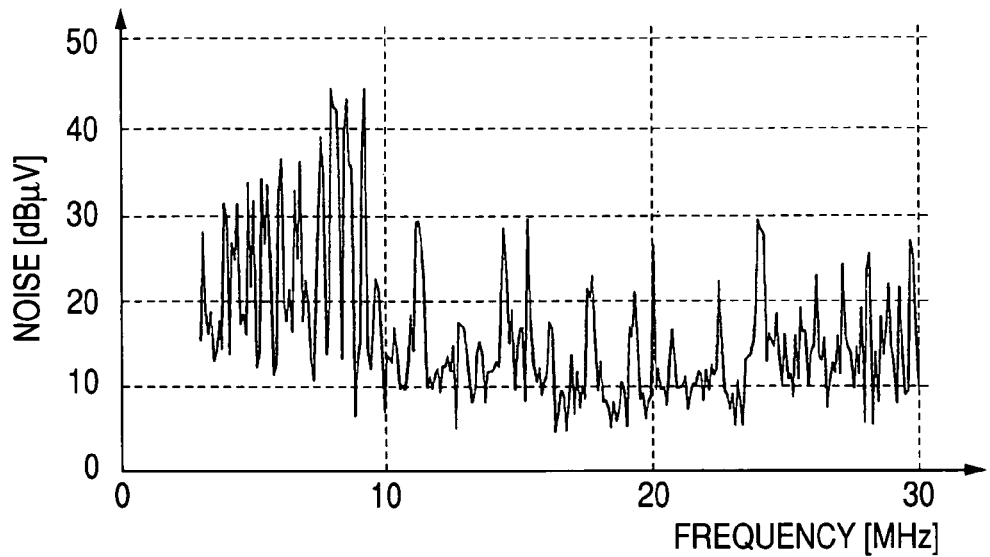
FIG. 5 is a diagram showing an example of noise characteristic of a broadcasting line according to an embodiment of the present invention.
Figure 6:
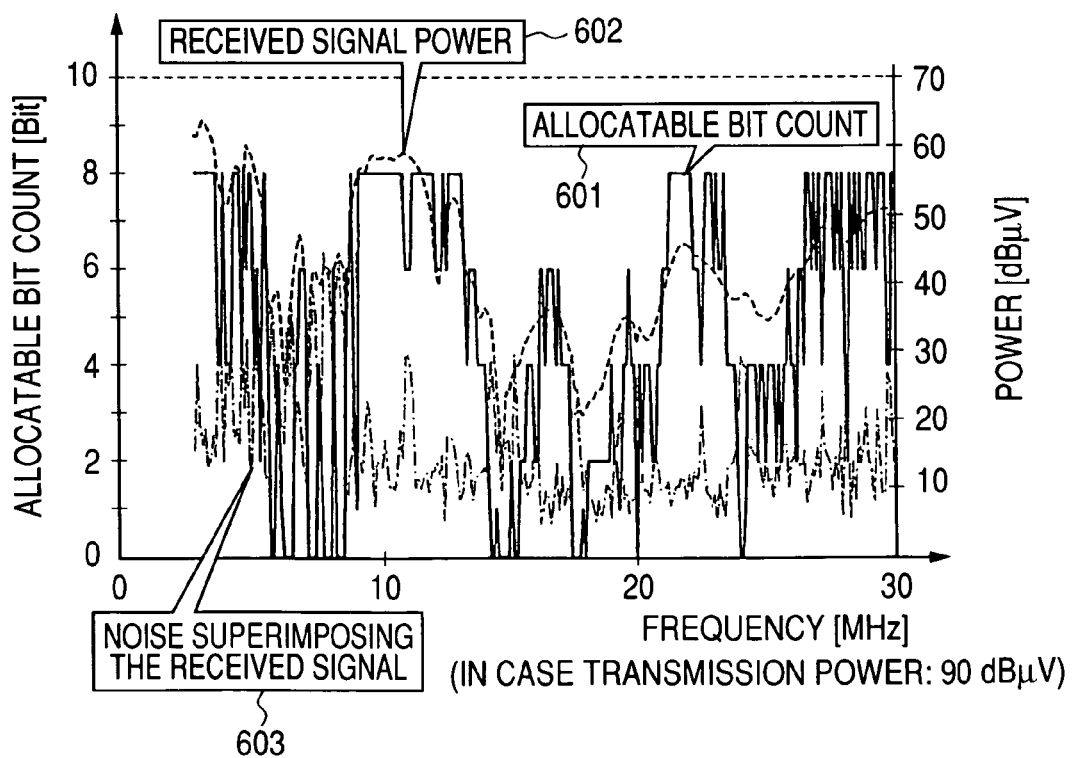
FIG. 6 is a diagram showing an example of bit count allocatable to a broadcasting line according to an embodiment of the present invention.

FIG. 4 shows the attenuation characteristic of non-twist type paired cable with which multiple modems are connected. In the description hereinafter, this paired cable is called the telecommunication line. FIG. 6 shows the bit count 601 allocatable to each frequency in case the transmission power is 90 dBµV. FIG. 6 is based on such a transmission path characteristic as shown in FIG. 4 and FIG. 5. Reference value of the bit error ratio is $10^{-5}$.

Since noise and attenuation differ depending upon the branching of the telecommunication line and measuring points, the bit count 601 allocatable to the carrier varies as shown in FIG. 6 depending upon the location of the modems. Accordingly, the difference between the power 602 of the received signal in FIG. 6 and noise 603 superimposing the received signal (because the "power" of the horizontal axis on the right in FIG. 6 is a logarithm of voltage, it is a "ratio" in terms of the magnitude of voltage, although a term "difference" is used) is measured in an advance training period and how many bits are allocatable to each carrier is calculated in accordance with the measured difference, and then the bit count 601 allocatable to each carrier is transmitted to the destination. If the sender side allocates data to carriers according to this allocation, the telecommunication based on the "most suitable modulation method" can be realized. In this description, "most suitable" means that the bit error ratio is lower than a reference value and yet the maximum throughput (data transmission volume in a unit time) can be achieved.

In order to enable all modems to demodulate at high probability, since noise and attenuation are different as explained above depending upon the measuring points and other factors between the modems transmitting and receiving data, the minimum difference between the power and noise of the received signal shall be obtained and the multi-valued modulation method for each carrier shall be determined so as to be the most suitable for the minimum value. Since the bit count allocatable to each carrier can be regarded as a quantized difference between the receiving power and noise, the "modulation method by which all modems can demodulate at high probability" can be well determined provided that the carrier allocation information for the data transmission from the master station modem to the slave station modems among the data indicated in the broken-line arrow (legend 119) in FIG. 2 and training result (carrier allocation information) for the data transmission from the slave station modems to the master station modem, both collected in the master station, are utilized and the minimum allocatable bit count is employed for every combination of the above data transmission.

Figure 7:
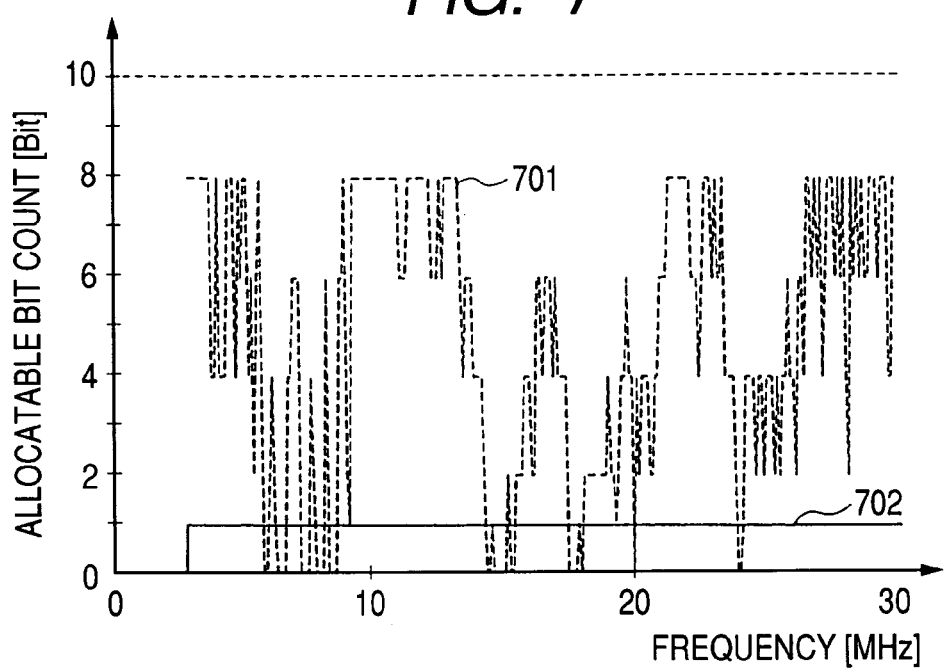
FIG. 7 ia a diagram showing an example of bit count allocatable to a broadcasting line (modulation method by which all the modems can demodulate but in which no transmission path characteristic is considered) according to an embodiment of the present invention.
Figure 8:
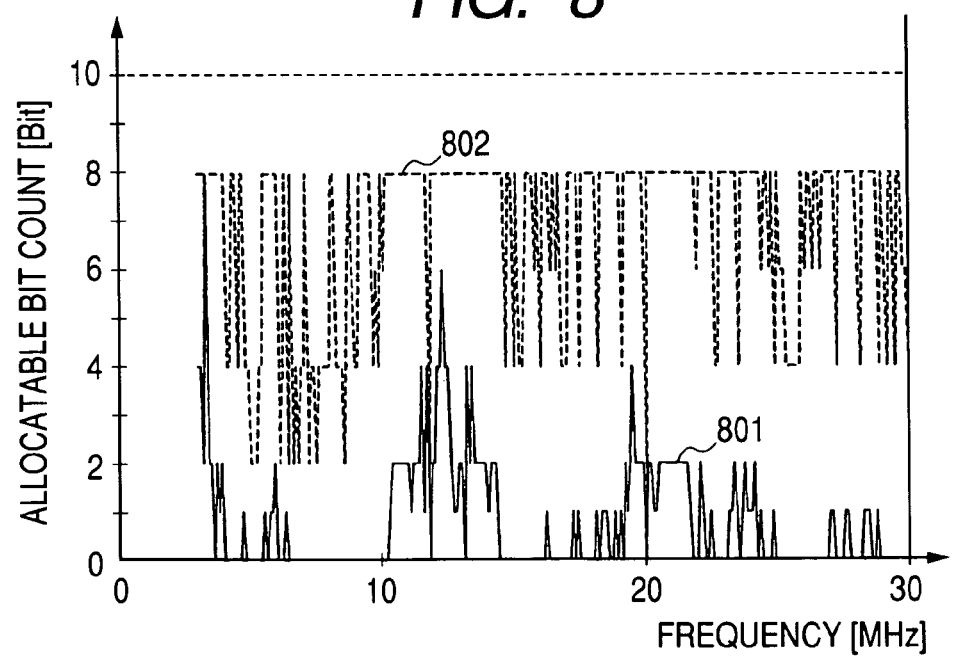
FIG. 8 is a diagram showing an example of bit count allocatable to a broadcasting line (in case each 96 dBµV and 120 dBµV is applied) according to an embodiment of the present invention.

Each FIG. 7 and FIG. 8 shows the bit count allocatable to carriers. FIG. 7 shows the most suitable bit allocation 701 to carriers between the modems shown in FIG. 6, and also the bit allocation 702 to carriers in the case of BPSK modulation, as an example of the "modulation method by which all the modems can demodulate but in which no transmission path characteristic is considered", where 1 bit of data can be transmitted by one carrier.

On the other hand, in FIG. 8, the most suitable bit allocation is obtained for the transmission between all modems and an envelope at the bottom of the chart shows the obtained bit allocation (minimum allocatable bit count). The bold line 801 is for a case that the transmission voltage is 90 dBµV and the broken line 802 is for a case that the transmission voltage is 120 dBµV. The modulation method of the carrier is 256QAM where 8 bits of data can be transmitted by one carrier.

FIG. 7 shows the most suitable bit allocation to carriers between specific modems. Since the frequency at which the allocatable bit count becomes zero is found from place to place, it is understood that no bit allocation is preferable for the carrier that uses the frequency adjacent to them. However, when the "modulation method by which all the modems can demodulate but in which no transmission path characteristic is considered" is employed, bit allocation applies also to those carriers and therefore noise becomes greater than the received signal power. Consequently, there remains a high possibility that the signal cannot be decoded correctly. Furthermore, carriers like these are not always few.

Accordingly, with the modulation method like this, there is a great possibility that all modems cannot decode the header and so fair coordination cannot be accomplished unless a coding system having high error correction capability is employed at the stage of coding. Such a situation that only a specific modem has less possibility of attaining the transmission right is not allowed for the plant control and monitoring application. On the other hand, according to the "modulation method by which all modems can demodulate at high probability" of the present invention, the probability for all modems to be able to decode the header can be made higher than specified, the probability to be able to attain the transmission right can be guaranteed higher than specified.

<<Second Method of Setting a Modulation Method>>

Of the methods of setting the "modulation method by which all modems can demodulate at high probability", the second method is described hereunder, using FIG. 8. The broken line 802 in FIG. 8 is for a case that the transmission voltage is 120 dBµV and it is understand that minimum 1 bit can be allocated to every carrier under this condition. Accordingly, an applicable modulation method shall be determined beforehand, such that all carriers be modulated by the BPSK as employed in this example, and the transmission voltage enabling such allocation shall be determined, and then the information is shared commonly by all modems by means of the multi-destination communication shown by the broken-line arrow 115 in FIG. 2.

In order to realize this, prior to the broken-line arrow 115 in the broken-line arrow sequence 114, it is necessary to calculate the minimum transmission voltage that enables the predetermined modulation method (BPSK in this example) in addition to determining the most suitable bit allocation between the modems. Besides, the result of the calculation needs to be informed from the slave station modems to the master station modem. The master station modem selects the maximum out of the minimum transmission voltages informed from all slave station modems and minimum transmission voltage calculated by itself, and it is the voltage to be transmitted by the multi-destination communication shown by the broken-line arrow 115.

<<Third Method of Setting a Modulation Method>>

Of the methods of setting the "modulation method by which all modems can demodulate at high probability", the third method is described hereunder. In this setting method, the bit count that can be transmitted by this modulation method is specified in advance. Then, the minimum difference between the power and noise of the received signal is obtained for each carrier and a sum of the bit count that can be transmitted at the obtained S/N ratio is obtained. If this does not reach the specified value, the transmission power shall be increased by a specified small increment (simply adding this small increment to the difference between the power and noise of the received signal is sufficient and actual communication is not needed) and another sum of the transmittable bit count is obtained under that condition. The comparison of the sum with the specified value is repeated until the sum of the transmittable bit count exceeds the specified value.

The result of this calculation shall be shared commonly by all modems by means of the multi-destination communication as shown by the broken-line arrow 115 in FIG. 2. In order to realize this, prior to the broken-line arrow 115 in the broken-line arrow sequence 114, it is necessary to calculate the minimum transmission voltage that can achieve the determined bit count in addition to determining the most suitable bit allocation between the modems. Besides, the result of the calculation needs to be informed from the slave station modems to the master station modem. The master station modem selects the maximum out of the minimum transmission voltages informed from all slave station modems and minimum transmission voltage calculated by itself, and it is the voltage to be transmitted by the multi-destination communication shown by the broken-line arrow 115.

Fairness among the modems in attaining the transmission right is not a function necessary only for a plant. For example, punctuality is necessary for the motion picture data from a monitor camera in a shopping mall, and it is an application where the fairness of attaining the transmission right and its guaranteed probability are very much important. If, however, the camera is provided with an image processing function, including a function of calculating the differential information from a previous observation time or a function of sensing specific changes in the image, the punctuality is not always needed because the observation time of each image can be identified.

<<Operation of Master Station Modem and Slave Station Modem>>

Figure 9:
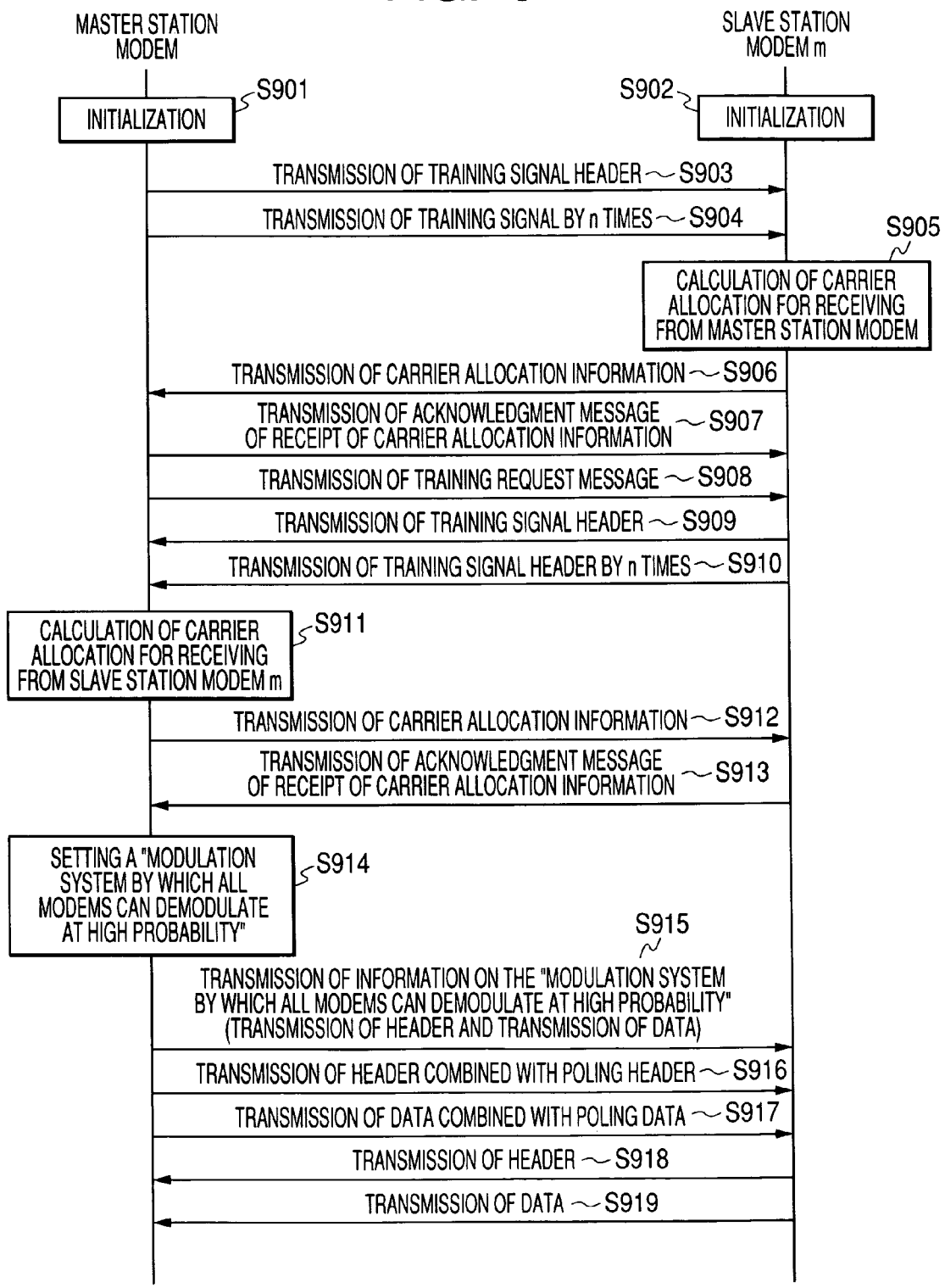
FIG. 9 is a flowchart showing the operation of the master station modem and slave station modem according to an embodiment of the present invention.

FIG. 9 shows the operation of the master station modem and slave station modem m. In this description, the slave station modem m is one slave station modem out of all slave station modems and so the operation of the slave station modem m is performed by all slave station modems. Similarly, the master station modem performs the operation for the master station modem m to all slave station modems. Basically speaking, the receiver side shall recognize the modulation method of the data to be received next by referring to the content of the header already received.

To begin with, the master station modem performs the initialization process (step S901) after turning on the power and, upon its completion, performs the training process for all slave station modems. On the other hand, the slave station modem m performs the initialization process (step S902) after turning on the power and, upon its completion, repeats receiving signals from the master station modem until a training signal header addressed to itself has been received.

In the training process, steps S903 to S913 are performed between the master station modem and slave station modem m. First, the master station modem transmits a training signal header to the slave station modem m (step S903). This transmission is performed by the "modulation method by which all the modems can demodulate but in which no transmission path characteristic is considered". Then, the master station modem transmits a training signal continuously by n times to the slave station modem m (step S904). The number of times n of transmitting the training signal shall have been specified beforehand. The number of times of transmission will be described in detail later.

On the other hand, succeedingly after receiving the training signal header from the master station modem, the slave station modem m receives the training signal from the master station modem by n times. Since the training signal does not contain any data to be transmitted, no coding is performed but a signal having a specified phase pattern serves as the signal for each carrier.

Upon completion of receiving the training signal by n times, the slave station modem m calculates the S/N ratio of the received signal. Since the S/N ratio is equivalent to the difference between the power 602 of the received signal and noise 603 superimposing the received signal, both shown in FIG. 6, the bit count 601 allocatable to each carrier is determined based on this difference. In short, it performs a carrier allocation calculation for receiving data from the master station modem (step S905).

Then, it transmits the result of the calculation, i.e. carrier allocation information to the master station modem (step S906). Even at this stage, the transmission signal is modulated by the "modulation method by which all the modems can demodulate but in which no transmission path characteristic is considered".

After receiving the carrier allocation information, the master station modem transmits an acknowledgment message of its receipt to the slave station modem m (step S907). Then, the master station modem transmits a training request message to the slave station modem m (step S908).

The slave station modem m, having received the receipt acknowledgment message, receives the training request message succeedingly, and transmits a training signal header to the master station modem in reply to the request (step S909). Furthermore, the slave station modem m transmits a training signal by n times continuously (step S910) and waits for carrier allocation information to be transmitted from the master station modem.

On the other hand, the master station modem, having transmitted a training request message to the slave station modem m (step S908), receives the training signal header and training signal from the slave station modem m and calculates the carrier allocation in the same manner as in step S905 of the slave station modem m (step S911), and then transmits the result of the calculation, i.e. carrier allocation information to the slave station modem m (step S912).

Upon receiving the carrier allocation information, the slave station modem m transmits a receipt acknowledgment message (step S913). Upon receiving the receipt acknowledgment message, the master station modem finishes the initialization sequence for the slave station modem m. After performing this initialization sequence for all slave station modems, the master station modem sets a "modulation method by which all the modems can demodulate but in which no transmission path characteristic is considered" according to the afore-mentioned method of setting the modulation method (step S914) and transmits the information on the defined modulation method to all slave station modems (step S915). In this transmission of information (step S915) and in the initialization sequence (steps S903 to S913), the "modulation method by which all the modems can demodulate but in which no transmission path characteristic is considered" shall be employed.

Furthermore, the master station modem repeats the operation in steps S916 to S919 for all slave station modems. This can be described as follows in view of the operation between the master station modem and slave station modem m. To begin with, the master station modem transmits a header combined with poling header to the slave station modem m (step S916). This is performed by the "modulation method by which all modems can demodulate at high probability" indicated by the information transmitted in step S915. Next, the master station modem transmits data combined with poling data after modulating them by the "most suitable modulation method" in accordance with the carrier allocation information transmitted from the slave station modem m in step S906 (step S917). In the steps S916 and S917, the transmission of header and data is combined with poling (acknowledgment of transmission request) in each process.

Upon completion of receiving the data combined with poling data, the slave station modem m has attained the transmission right. Consequently, the slave station modem m transmits the header (step S918) and data (step S919) to the master station modem. In transmitting the header, the "modulation method by which all modems can demodulate at high probability" indicated by the information transmitted from the master station modem in step S915 is employed. In transmitting the data, the "most suitable modulation method" in accordance with the carrier allocation information transmitted from the master station modem in step S912 is employed.

Talking about nose hereunder, since noise is likely to vary depending upon the operating condition of apparatuses in the plant, frequent training is required, for example once every second, if periodical training is to be performed. In addition, for the plant control and monitor application, training by less training symbol number is also important so as to minimize an overhead as much as possible. Provided that the training symbol number, symbol frequency and number of terminals (number of slave station modems) are defined, the overhead due to training is expressed by the following Expression 1.

Overhead due to training=Number of terminals× Training symbol number×Symbol frequency     Expression 1

A design reference shall be defined for the overhead, like less than 5% of the training interval of one second, that is, less than 50 [msec], and the training symbol number shall be defined so as to meet the design reference. FIG. 12 shows the relationship among the training symbol number, number of terminals and overhead in case the symbol frequency is 1/35 [msec] (symbol frequency is 35 [kHz]). If the number of terminals is increased too much or overhead allowance is decreased too much, the training symbol number decreases and consequently the measurement accuracy of the S/N ratio of each carrier degrades. To avoid this, it is recommended to set a design reference also for the minimum training symbol number.

Other Embodiments

A preferred embodiment of the present invention has been described above. However, the invention is not limited to the above embodiment but is modifiable as needed so far as the intent of the invention is met. For example, embodiments as follows are available.

(1) Although the description of the transmission of user data in the sequence 116 in FIG. 2 specifies modulation by the "most suitable modulation method", the "modulation method by which all modems can demodulate at high probability" may be employed as for the transmission of header.

Figure 10:
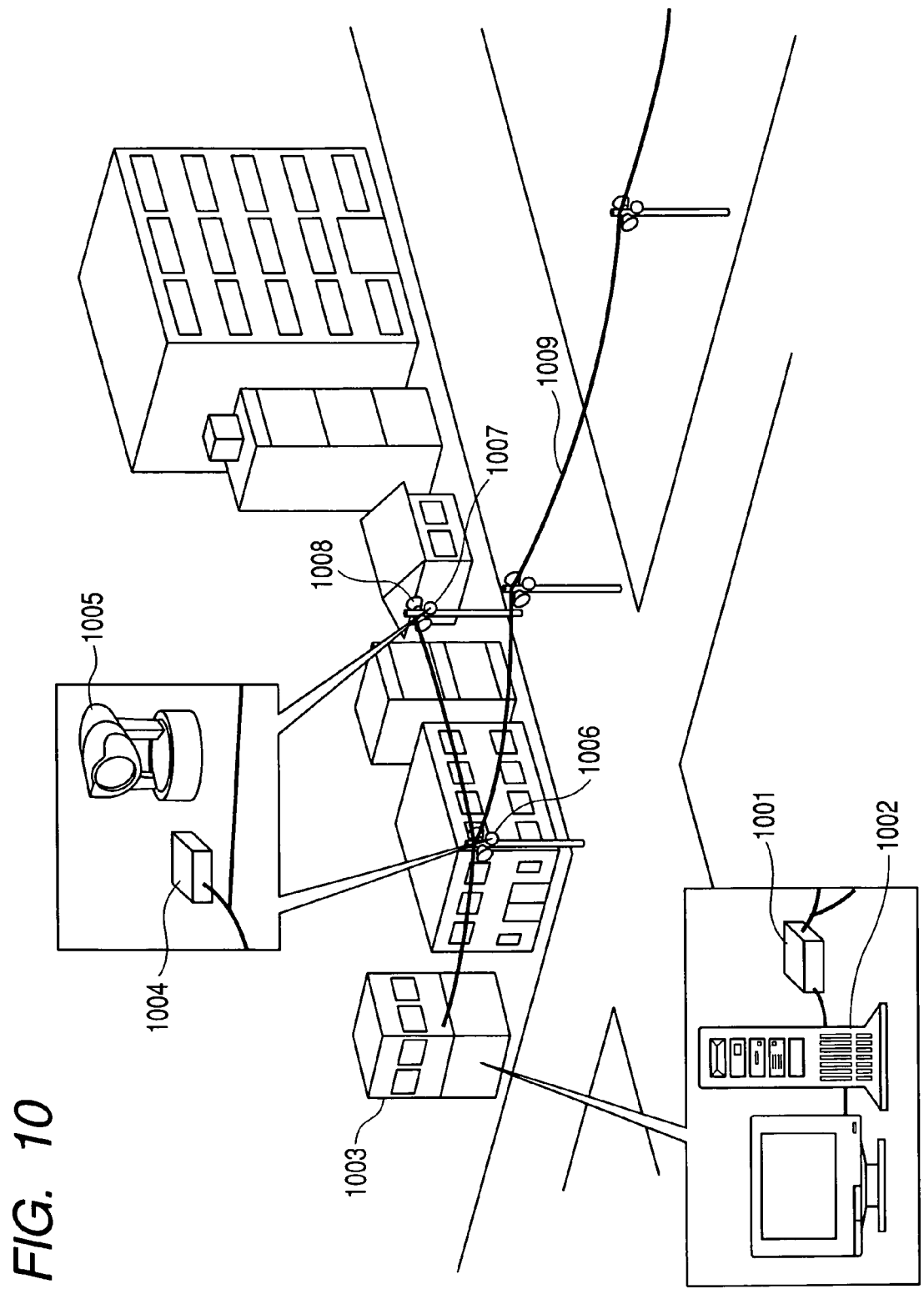
FIG. 10 is a view showing an example of security monitoring system using the control and monitoring telecommunication system according to an embodiment of the present invention.

(2) FIG. 10 shows an embodiment where the control and monitoring telecommunication system of the present invention is applied to a security monitoring system using a broadcasting line 1009 of a shopping mall or for disaster prevention. A master station modem 1001 is installed on an image storage unit 1002 placed in an office 1003 in the shopping mall or in a governmental office, and camera units 1006 and 1007 are installed on a speaker 1008 installed on street poles. The image storage unit 1002, which is a unit for storing, compressing and analyzing the image data taken by a monitor camera 1005, can be realized in the form of PC or server. It is not always necessary to install a camera unit near an existing speaker but it can be installed on another street pole with no speaker installed by modifying the broadcasting line. Each camera unit 1006 and 1007 of the slave station comprises a slave station modem 1004 and monitor camera 1005 for obtaining image data.

Description of Symbols
Reference sigh used in the disclosure mean the followings parts:
105 ... Master station modem (communication means)
106, 107, 108 Slave station modem (communication means)
109, 110, 111, 112 Control unit
121 Telecommunication line
114 Initialization sequence
115 Transmission of information on the "modulation method by which all modems can demodulate at high probability"
116 User data transmission/receiving sequence

What is claimed is:

1. A method of setting a modulation scheme in a control and monitoring telecommunication system comprising multiple communication means for communication between apparatuses installed at a site in a specified area and a control room, a first communication means serving as a master station and a second communication means serving as a slave station comprising:

measuring a S/N ratio in the communication between the master station and the slave station;

setting a transmission voltage according to the measured S/N ratio, at which a sum of data volume allocated to a carrier wave signal of each frequency band becomes greater than specified; and allocating data to the carrier wave signal of each frequency band.

2. A control and monitoring telecommunication system for communication between a control room and a plurality of remotely located apparatuses through an existing telecommunication line, comprising:

a master communication means connected to the control room;

a plurality of slave communication means connected to the plurality of remotely located apparatuses;

wherein the master communication means is connected to the existing telecommunication line through a master modem;

wherein the slave communication means is connected to the existing telecommunication line through a plurality of slave modems;

a means for setting a data volume allocated to a carrier wave signal according to either a S/N ratio or a data transmission error ratio in each frequency band of the carrier wave signal;

a means for using the carrier wave signal of one or more frequency bands to which the data volume has been allocated;

a means for measuring the S/N ratio in the communication between the master communication means and slave communication means and setting the data volume to allocate to the carrier wave signal so as to perform communication; and a modulation means for obtaining the minimum S/N ratio in each frequency band of the carrier wave signal and setting the data volume to allocate to the carrier wave signal according to the obtained minimum S/N ratio so as to perform communication.

3. A control and monitoring telecommunication system according to claim 2, wherein the communication is performed in the data transmission/receiving for coordination or control between the master and slave communication means.

4. A control and monitoring telecommunication system according to claim 2, wherein the master and slave communication means are located at a site for a monitor system and the plurality of remotely located apparatuses comprises a monitor camera for obtaining image data and a server installed in the control room for performing operations on image data obtained by the monitor camera, and wherein the master and slave communication means performs communication between the monitor camera and server.

5. A control and monitoring telecommunication system for communication between a control room and a plurality of remotely located apparatuses through an existing telecommunication line, comprising:
- a master communication means connected to the control room;
- a plurality of slave communication means connected to the plurality of remotely located apparatuses;
    - wherein the master communication means is connected to the existing telecommunication line through a master modem;
    - wherein the slave communication means is connected to the existing telecommunication line through a plurality of slave modems;
- a means for setting a data volume allocated to a carrier wave signal according to either a S/N ratio or a data transmission error ratio in each frequency band of the carrier wave signal;
- a means for using the carrier wave signal of one or more frequency bands to which the data volume has been allocated;
- a means for measuring the S/N ratio in the communication between the master communication means and slave communication means and setting the data volume to allocate to the carrier wave signal so as to perform communication; and
- a modulation means for obtaining from the measured S/N ratio a transmission voltage at which the data volume allocated to the carrier wave signal of each frequency band becomes greater than specified, and performs communication based on the obtained transmission voltage.

6. A control and monitoring telecommunication system according to claim 5, wherein the communication is performed in the data transmission/receiving for coordination or control between the master and slave communication means.

7. A control and monitoring telecommunication system according to claim 5, wherein the master and slave communication means is located at a site for a monitor system and the plurality of remotely located apparatuses comprises a monitor camera for obtaining image data and a server installed in the control room for performing operations on image data obtained by the monitor camera, and wherein the master and slave communication means performs communication between the monitor camera and server.

8. A control and monitoring telecommunication system for communication between a control room and a plurality of remotely located apparatuses through an existing telecommunication line, comprising:
- a master communication means connected to the control room;
- a plurality of slave communication means connected to the plurality of remotely located apparatuses;
    - wherein the master communication means is connected to the existing telecommunication line through a master modem;
    - wherein the slave communication means is connected to the existing telecommunication line through a plurality of slave modems;
- a means for setting a data volume allocated to a carrier wave signal according to either a S/N ratio or a data transmission error ratio in each frequency band of the carrier wave signal;
- a means for using the carrier wave signal of one or more frequency bands to which the data volume has been allocated;
- a means for measuring the S/N ratio in the communication between the master communication means and slave communication means and setting the data volume to allocate to the carrier wave signal so as to perform communication; and
- a modulation means for obtaining from the measured S/N ratio a transmission voltage at which a sum of the data volume to allocate to the carrier wave signal of each frequency band becomes greater than specified and allocates the data volume to the carrier wave signal of each frequency band, and performs communication based on the obtained transmission voltage and allocation data volume.

9. A control and monitoring telecommunication system according to claim 8, wherein the communication is performed in the data transmission/receiving for coordination or control between the master and slave communication means.

10. A control and monitoring telecommunication system according to claim 8, wherein the master and slave communication means is located at a site for a monitor system and the plurality of remotely located apparatuses comprises a monitor camera for obtaining image data and a server installed in the control room for performing operations on image data obtained by the monitor camera, and wherein the master and slave communication means performs communication between the monitor camera and server.

11. A method of setting a modulation method in a control and monitoring telecommunication system comprising multiple communication means for communication between apparatuses installed at a site in a specified area and a control room, a first communication means serving as a master station and a second communication means serving as a slave station, comprising:
- measuring a S/N ratio in the communication between the master station and a plurality of slave stations;
- obtaining the minimum S/N ratio in each frequency band of a carrier wave signal from the measured S/N ratio;
- allocating data to the carrier wave signal according to the obtained minimum S/N ratio; and
- setting a transmission voltage according to the measured S/N ratio, at which the data volume allocated to the carrier wave signal of each frequency band becomes greater than specified.

* * * * *

UNITED STATES PATENT AND TRADEMARK OFFICE
CERTIFICATE OF CORRECTION

PATENT NO. : 7,570,748 B2
APPLICATION NO. : 11/018355
DATED : August 4, 2009
INVENTOR(S) : Ishii et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this

Seventh Day of September, 2010

David J. Kappos
*Director of the United States Patent and Trademark Office*